A. R. OLLER.
TRACTOR.
APPLICATION FILED JUNE 7, 1920.
1,374,763. Patented Apr. 12, 1921.
5 SHEETS—SHEET 1.
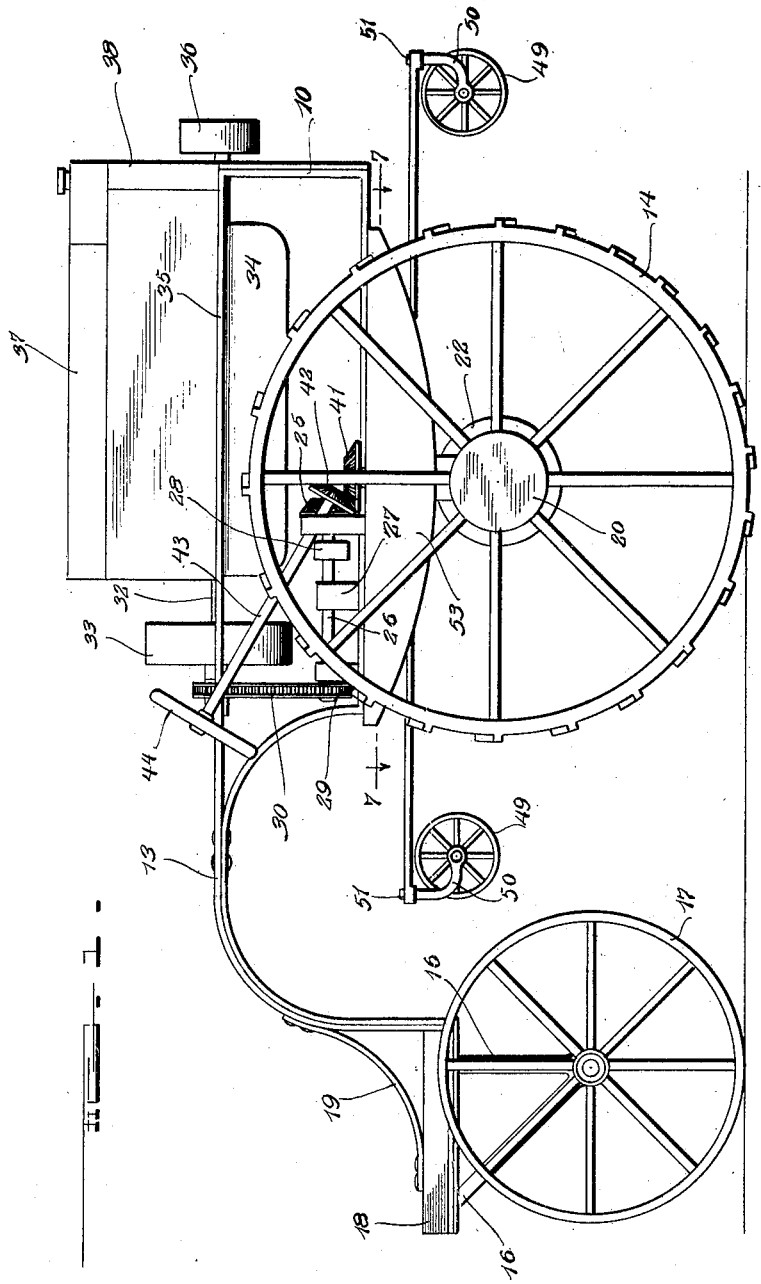
Andy R. Oller
INVENTOR
BY Victor J. Evans
ATTORNEY
WITNESS:

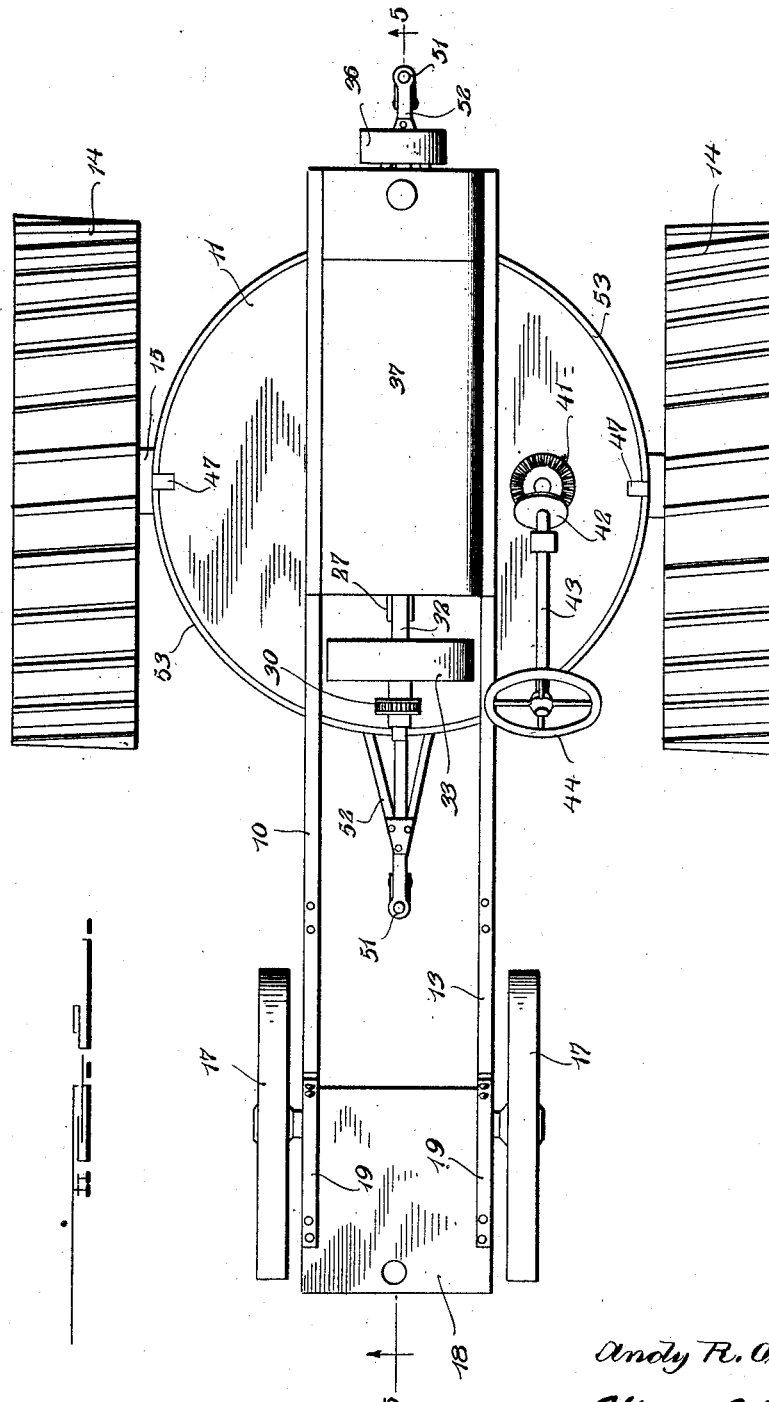

A. R. OLLER.
TRACTOR.
APPLICATION FILED JUNE 7, 1920.
1,374,763. Patented Apr. 12, 1921.
5 SHEETS—SHEET 3.
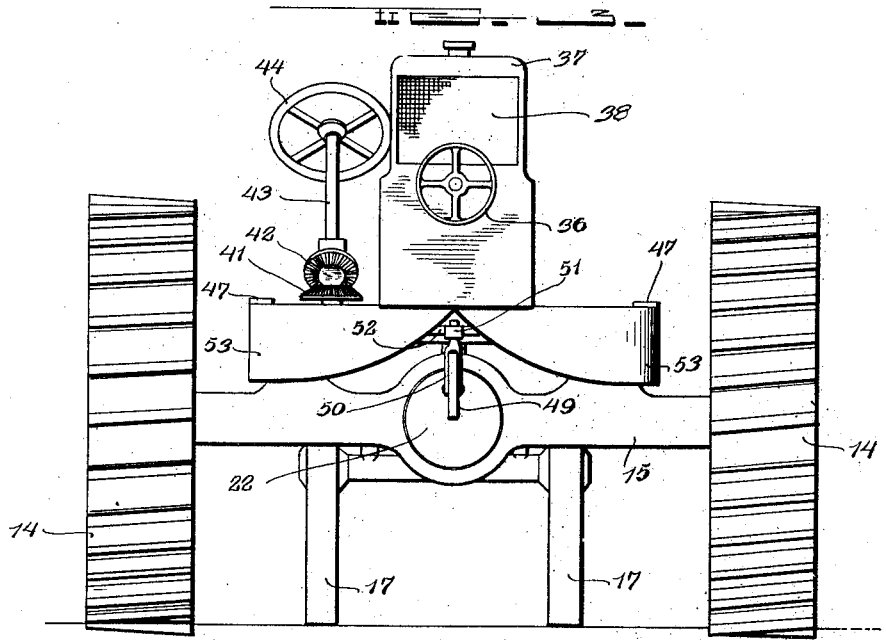
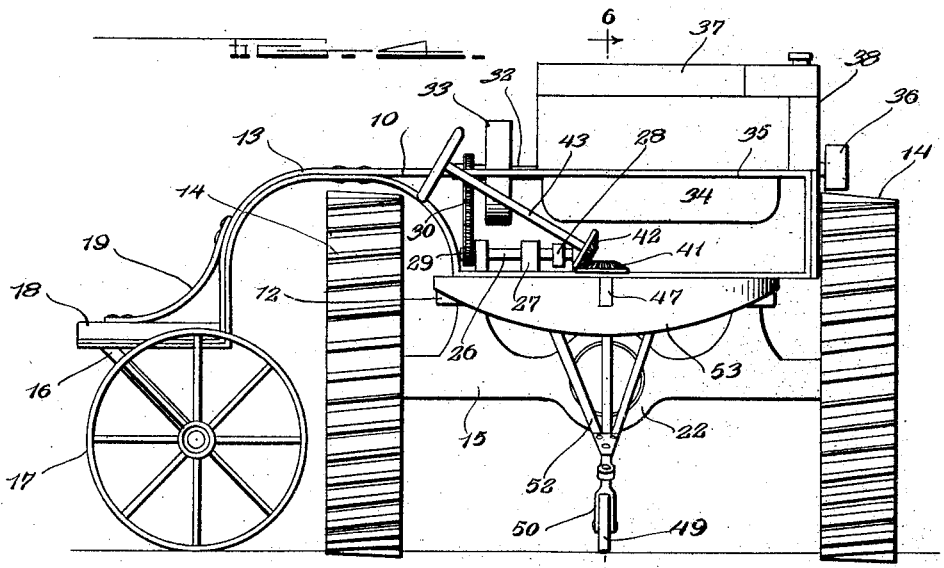
Andy R. Oller
INVENTOR
BY Victor J. Evans
ATTORNEY
WITNESS

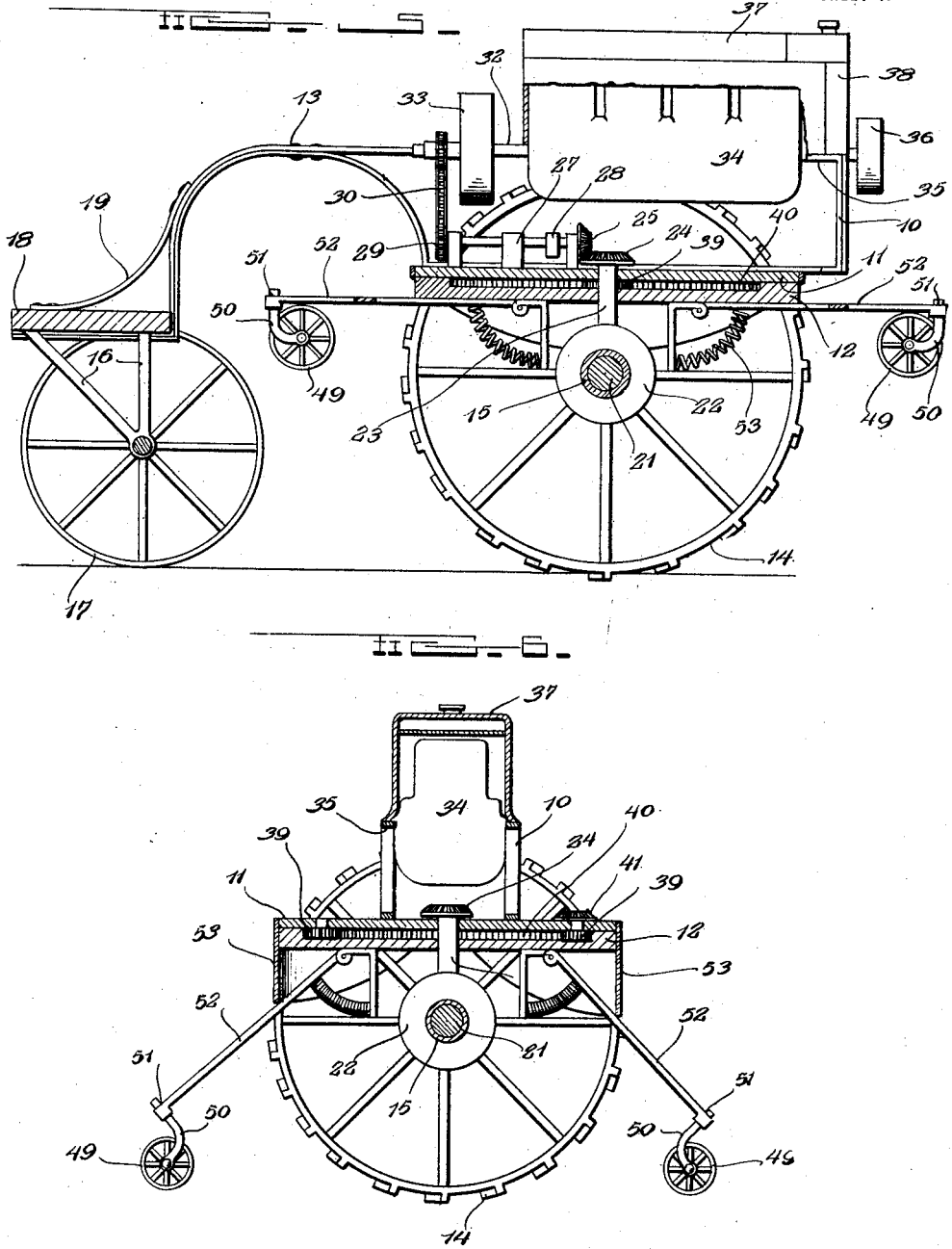

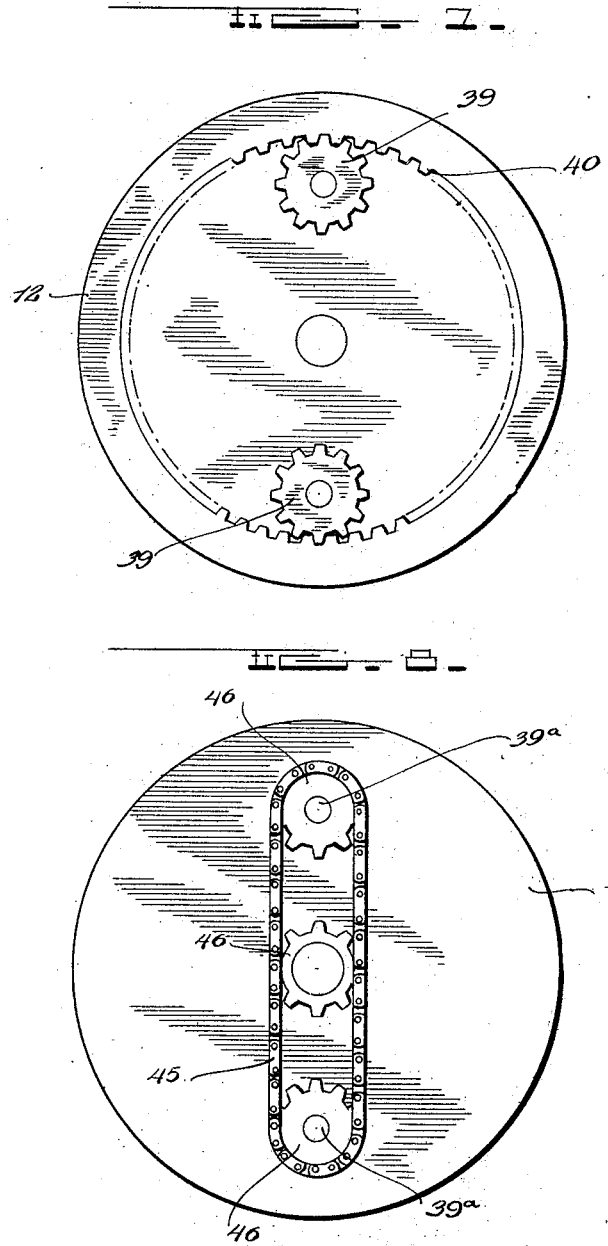

UNITED STATES PATENT OFFICE.

ANDY R. OLLER, OF BEAVER DAM, KENTUCKY.

TRACTOR.

1,374,763.  Specification of Letters Patent.  Patented Apr. 12, 1921.

Application filed June 7, 1920. Serial No. 387,067.

*To all whom it may concern:*

Be it known that I, ANDY R. OLLER, a citizen of the United States, residing at Beaver Dam, in the county of Ohio and State of Kentucky, have invented new and useful Improvements in Tractors, of which the following is a specification.

The object of the invention is to provide a machine of the tractor type which may be more conveniently operated in the field in plowing and in cultivating crops, particularly with a view to making sharp or square turns so as to enable the operator to plow more ground by working closer to fences, ditches and other obstructions than is possible with the tractors now commonly used, and to this end the invention consists in a construction, combination and relation of parts of which a preferred embodiment is shown in the accompanying drawings, wherein:—

Figure 1 is a side view of the tractor in its normal progressive position.

Fig. 2 is a plan view of the same.

Fig. 3 is a front view.

Fig. 4 is a side view with the drive wheels turned at right angles to the length of the machine.

Fig. 5 is a longitudinal section on the plane indicated by the line 5—5 of Fig. 2.

Fig. 6 is a sectional view on the plane indicated by the line 6—6 of Fig. 4.

Fig. 7 is a horizontal sectional view on the plane indicated by the line 7—7 of Fig. 1.

Fig. 8 is a view similar to Fig. 7 showing connections whereby the turning of the movable member of the fifth wheel structure may be effected by the power of the engine.

The reinforced frame 10, surmounted and carried by the relatively stationary upper member 11 of a fifth wheel of which the lower rotary member is indicated at 12 is provided with an arch 13 to permit of the turning thereunder of the traction wheels 14 carried by the axle 15 which in turn supports said revoluble member 12 of the fifth wheel structure, to the end that the traction wheels may be turned to progress in a direction at right angles (or any preferred intermediate angle) to the length of the main frame, upon the rear portion of which, by means of suitable pendant brackets 16 are mounted the road wheels 17, designed for employment in moving the tractor from one place of use to another but adapted to be removed when the tractor is connected with machinery to be drawn, the attachment being made at the hitch member 18 extending rearwardly from the arch 13 and suitably braced as indicated at 19.

The traction wheels 14 are provided with suitable anti-friction bearings as indicated at 20 and are carried by and receive motion from a shaft 21 provided with the usual differential gear 22 and receiving motion from a vertical transmission shaft 23 extending upward through the fifth wheel structure and provided at its upper end with a bevel gear 24. This bevel gear in turn receives motion from a pinion 25 carried by the shaft 26 provided with suitable transmission gearing 27 and a brake 28 and having a sprocket wheel 29 connected by chains 30 with a similar sprocket secured to the engine or crank shaft 32 which carries the clutch 33. The engine is indicated at 34 supported upon the upper longitudinal hanger bars 35 of the reinforced frame, a belt pulley 36 being arranged on the forward end of said crank shaft and the fuel tank 37 being located above the engine with a radiator 38 arranged in advance of the same.

The turning of the rotary member of the fifth wheel structure to determine the direction of progress of the tractor is effected by pinions 39 meshing with an internal gear 40 carried by the member 12 of said fifth wheel and having their spindles mounted in the stationary or upper member of the fifth wheel, the spindle of one of said pinions being extended to carry a bevel gear 41 with which meshes a bevel pinion 42 actuable by the steering post 43 provided with the usual steering wheel 44, or if it is desired to control the direction of progress of the machine by the engine, a sprocket chain connection 45 as indicated in Fig. 8 of the drawings may be provided between sprocket wheels 46 on the spindles of the pinions 39ª which mesh with the internal gear 40ª, said chain being actuable to turn said pinions and hence the revoluble member of the turn-table or fifth wheel, by a driving sprocket 46 secured to the upright spindle of the lower member of the fifth wheel structure which, as above indicated, carries the axle housing and the traction or driving wheels.

The proper relative positions of the members of the fifth wheel structure are maintained by means of guides 47 which, carried by the upper or stationary member of said structure extend downward exteriorly of and under the lower or revoluble member of the fifth wheel.

Also in order to provide against the lateral tilting movement of the machine, or in other words to maintain the upright stability of the machine, when the driving or traction wheels are turned at a sharp angle as for instance when one of these wheels is located under the arch 13, there are employed balance wheels 49 of which the forks 50 are swiveled as at 51 upon supporting arms 52 yieldingly mounted upon the revoluble member of the turntable and adapted for depression to bring the balance wheels in contact with or proximity to the surface of the ground or the level upon which the machine is operating, by cam guiding means 53 carried by and depending from the stationary member of the fifth wheel as indicated clearly in Fig. 4.

The balance wheel supporting arms may be yieldingly held in their elevated or inoperative positions by any suitable means as by forming them of resilient material, inasmuch as they are subjected to no strain when elevated and are engaged in their operative positions at points relatively adjacent to the balance wheels by the depressing cams which thus fortify them and serve to communicate thereto any tendency of the frame of the machine to tilt to one side or the other.

What is claimed is:—

1. A tractor having a fifth wheel comprising relatively stationary and revoluble members of which the latter carries the traction wheels and the former the frame for supporting the engine and its connections, the axle driving shaft being disposed in coaxial relation with the fifth wheel, and movable balance wheels for depression into operative relation with the plane of support of the traction wheels when the latter are disposed in angular relation with the normal direction of progress of the machine.

2. A tractor having a fifth wheel comprising relatively stationary and revoluble members of which the latter carries the traction wheels and the former the frame-work for supporting the engine and its connections, depressible balance wheels carried by the revoluble member of the fifth wheel, and means carried by the stationary member of the fifth wheel for depressing the balance wheels when the traction wheels are turned to occupy a position at an angle to the normal path of progress of the machine.

3. A tractor having a fifth wheel comprising relatively stationary and revoluble members of which the latter carries the traction wheels and the former the frame for supporting the engine and its connections, normally elevated yieldingly mounted balance wheels carried by the revoluble member of the fifth wheel for depression into ground engaging relation when the traction wheels are turned at an angle to the normal path of progress of the machine and means for effecting the depression of said balance wheels.

4. A tractor having a fifth wheel comprising relatively stationary and revoluble members of which the latter carries the traction wheels and the former the frame for supporting the engine and its connections, ground wheels having supporting arms yieldingly mounted upon the revoluble member of the fifth wheel and normally held in an elevated and inoperative position, and cam guides carried by the stationary member of the fifth wheel in the paths of said supporting arms for depressing the latter to arrange the balance wheels in operative relation with the ground when the traction wheels are turned to occupy a position at an angle to the normal path of progress of the machine.

In testimony whereof I affix my signature.

ANDY R. OLLER.